United States Patent
Starkey et al.

(10) Patent No.: US 11,402,535 B1
(45) Date of Patent: *Aug. 2, 2022

(54) WASTE RECEPTACLE CONFIGURED TO DIFFERENTIATE ITEMS

(71) Applicant: DITEQT, LLC, Amesbury, MA (US)

(72) Inventors: Michael Morgan Starkey, Kent, OH (US); Lloyd Stephen Riggs, Auburn, AL (US); Aubrey Nathan Beal, Scottsboro, AL (US)

(73) Assignee: DITEQT LLC, Amesbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,505

(22) Filed: Sep. 22, 2020

Related U.S. Application Data

(63) Continuation of application No. 15/884,807, filed on Jan. 31, 2018, now Pat. No. 10,795,045.

(60) Provisional application No. 62/452,975, filed on Jan. 31, 2017.

(51) Int. Cl.
  *G01V 3/38* (2006.01)
  *B65F 1/14* (2006.01)
  *G01V 3/10* (2006.01)

(52) U.S. Cl.
  CPC ............. *G01V 3/38* (2013.01); *B65F 1/14* (2013.01); *G01V 3/10* (2013.01); *B65F 2210/1525* (2013.01)

(58) Field of Classification Search
  CPC ... B65F 1/14; B65F 2210/1525; G01V 3/104; G01V 3/105; G01V 3/15; G06K 9/3241
  See application file for complete search history.

(56) References Cited

U.S. PATENT DOCUMENTS

| | | | |
|---|---|---|---|
| 3,904,218 A | 9/1975 | Kostic | |
| 4,834,253 A | 5/1989 | Crine | |
| 5,001,425 A | 3/1991 | Beling et al. | |
| D351,700 S | 10/1994 | Uzelman | |
| D374,529 S | 10/1996 | Sanderson | |
| 5,576,621 A | 11/1996 | Clements | |
| 5,659,247 A | 8/1997 | Clements | |
| 6,222,450 B1 | 4/2001 | Clements | |
| 6,833,789 B1 | 12/2004 | Carmen et al. | |
| 6,853,194 B2 * | 2/2005 | Nelson | G01V 3/104 324/329 |
| 6,879,161 B2 * | 4/2005 | Rowan | G01V 3/104 324/329 |
| D555,870 S | 11/2007 | Zorzo | |
| 7,296,683 B1 | 11/2007 | Vallelonga, Sr. et al. | |

(Continued)

FOREIGN PATENT DOCUMENTS

WO 2016190889 A1 12/2016

*Primary Examiner* — Elias Desta
(74) *Attorney, Agent, or Firm* — Chad D. Tillman; Tillman Wright, PLLC

(57) ABSTRACT

A system includes a metal detector, a structure to hold the metal detector, and a processing unit which processes the measured signal from the metal detector. The measured signals of known objects are recorded with the metal detector. The signals are processed into sets of variables. When an unknown object is detected by the metal detector, the measured signal is processed into the same variables. The variables from the measured signal are compared against the variables in the database. If a match is found, the unknown object is determined.

18 Claims, 3 Drawing Sheets

(56) References Cited

U.S. PATENT DOCUMENTS

| | | |
|---|---|---|
| 7,639,136 B1 | 12/2009 | Wass et al. |
| D642,763 S | 8/2011 | Liang |
| 8,905,413 B2 | 12/2014 | Henniges et al. |
| 9,089,318 B2 | 7/2015 | Henniges et al. |
| 9,194,112 B1 | 11/2015 | Melin et al. |
| 9,194,113 B1 | 11/2015 | Melin et al. |
| 9,486,839 B2 * | 11/2016 | Torek .................... B07C 5/3416 |
| 9,637,309 B2 | 5/2017 | Starkey et al. |
| 9,840,369 B2 | 12/2017 | Starkey et al. |
| 9,842,484 B2 | 12/2017 | Starkey et al. |
| 9,922,304 B2 | 3/2018 | DeBusk et al. |
| 10,077,153 B2 | 9/2018 | Starkey et al. |
| D833,700 S | 11/2018 | Starkey |
| 10,121,354 B2 | 11/2018 | Starkey et al. |
| 10,207,296 B2 * | 2/2019 | Garcia .................... B07C 5/346 |
| 10,710,119 B2 * | 7/2020 | Kumar .................. B07C 5/3422 |
| 10,777,069 B2 | 9/2020 | Starkey et al. |
| 10,795,045 B1 * | 10/2020 | Starkey .................... G01V 3/38 |
| 10,815,053 B2 | 10/2020 | Starkey et al. |
| 11,000,341 B2 | 5/2021 | Henniges et al. |
| 2004/0000904 A1 | 1/2004 | Cotter |
| 2006/0014996 A1 | 1/2006 | Brown |
| 2006/0231158 A1 | 10/2006 | Quiring |
| 2007/0204888 A1 | 9/2007 | Miller |
| 2010/0201090 A1 | 8/2010 | Henniges et al. |
| 2011/0156903 A1 | 6/2011 | Henniges et al. |
| 2013/0175373 A1 | 7/2013 | Morgan et al. |
| 2013/0248395 A1 | 9/2013 | Guthrie |
| 2013/0277283 A1 | 10/2013 | Kaeser |
| 2013/0333328 A1 | 12/2013 | Henniges et al. |
| 2014/0262553 A1 | 9/2014 | Pollock et al. |
| 2015/0127362 A1 | 5/2015 | DeBusk et al. |
| 2017/0029207 A1 | 2/2017 | Starkey et al. |
| 2017/0144836 A1 | 5/2017 | Starkey et al. |
| 2017/0144837 A1 | 5/2017 | Starkey et al. |
| 2017/0183150 A1 | 6/2017 | Starkey et al. |
| 2017/0183151 A1 | 6/2017 | Starkey et al. |
| 2018/0102043 A1 | 4/2018 | Starkey et al. |
| 2018/0111753 A1 | 4/2018 | Starkey et al. |
| 2018/0357882 A1 | 12/2018 | Henniges et al. |
| 2018/0368933 A1 | 12/2018 | Henniges et al. |
| 2019/0016530 A1 | 1/2019 | Starkey et al. |
| 2019/0027014 A1 | 1/2019 | Starkey et al. |
| 2019/0362839 A1 | 11/2019 | Quintini et al. |
| 2020/0410840 A1 | 12/2020 | Starkey et al. |

* cited by examiner $$\bar{v}_M = [v_{M1}, v_{M2}, \ldots v_{MN}] \quad (1)$$

$$\bar{v}_J = [v_{J1}, v_{J2}, \ldots v_{JN}] \; J = 1, 2, \ldots K \quad (2)$$

$$D_{M,J} = \sum_{i=1}^{N} [v_{M,i} - v_{J,i}] \times [v_{M,i} - v_{J,i}] \quad (3)$$

WASTE RECEPTACLE CONFIGURED TO DIFFERENTIATE ITEMS

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to metal detection, particularly in a medical context.

Medical procedures make use of several types of materials: soft goods, non-woven goods, tools, etc. At the end of a medical procedure, there are two pathways which all items used in the procedure will undergo: disposal or reuse. Items which are disposed of generally consist of inexpensive items such as towels, clips, and plastic bins. Items which are reused tend to be expensive tools and other more expensive objects that can be sterilized and used for another procedure. When an item is disposed of that was intended to be reused, it often creates a significant financial loss for the company operating the procedure room. Some items carry a significant expense which warrants a special crew to dig through the medical waste to find and recover the item. This process is expensive and poses an increased risk of contamination.

As some valuable reusable items comprise metal, metal detectors have been used at the point of disposal to catch reusable items before they are disposed of. For example, a metal detector can be disposed proximate a disposal container that will provide a signal to personnel cleaning a room when they have thrown an object away that should not have been thrown away, thus allowing them to remove the object before it is disposed.

However, medical procedures will often make use of disposable items which contain metal. An example of a disposable item with metal is a sheet with annealed metal wire that is intended to be wrapped or tied about an object to affix the sheet in place. When this sheet is disposed of, a conventional loss prevention metal detector would detect this metal and sound an alarm. An individual disposing of the sheet with the metal tie would not know if the detector was detecting the metal tie in the sheet or an expensive tool which is caught in the sheet along with the metal tie.

A need exists for improvement in metal detection methodologies. This, and other needs, are addressed by one or more aspects of the present invention.

SUMMARY OF THE INVENTION

The present invention includes many aspects and features. Moreover, while many aspects and features relate to, and are described in a particular context, the present invention is not limited to use only in this context, as will become apparent from the following summaries and detailed descriptions of aspects, features, and one or more embodiments of the present invention.

Accordingly, one aspect of the present invention relates to a method for discriminating and identifying metallic objects with a metal detector within a medical space to prevent false detection alarms.

Another aspect relates to a system comprising a metal detector, a structure to hold the metal detector, and a processing unit which processes the measured signal from the metal detector. The measured signals of known objects are recorded with the metal detector. The signals are processed into sets of variables. When an unknown object is detected by the metal detector, the measured signal is processed into the same variables. The variables from the measured signal are compared against the variables in the database. If a match is found, the unknown object can be determined.

Another aspect relates to a method for discriminating and identifying metallic objects utilizing one or more metal detectors disposed proximate a disposal repository to prevent false detection alarms. The method includes maintaining an electronic library of measured voltage versus time responses, each maintained voltage versus time response corresponding to an object for which it is desired that an alarm not be provided; maintaining a comparison threshold; measuring, utilizing the one or more metal detectors, a voltage versus time response for an unknown object dropped into the disposal repository. The method further includes, for each respective maintained response in the electronic library, until either it is determined that a match is found or all maintained responses have been compared without a match having been found, comparing the sum of the squares of the differences between the measured response for the unknown object and the respective maintained response to the comparison threshold, and if the sum of squared differences is less than the comparison threshold, determining that a match has been found and an alarm should not be provided, or if the sum of squared differences is greater than the comparison threshold, determining that a match has not been found, wherein the sum of squared differences for a particular maintained response of the electronic library is determined to be less than the comparison threshold; and wherein, based on the determination that the sum of squared differences for the particular maintained response of the electronic library is less than the comparison threshold, an alarm is not provided.

In a feature of this aspect, the disposal repository comprises a waste disposal repository.

In a feature of this aspect, the maintained electronic library of responses comprises responses corresponding to disposable objects containing medical which are commonly used in a medical facility.

In a feature of this aspect, the maintained electronic library of responses comprises a response corresponding to a sheet with an annealed metal wire.

In a feature of this aspect, the maintained electronic library of responses comprises a response corresponding to a foil-backed wrapper.

In a feature of this aspect, the disposal repository is located at a medical facility.

In a feature of this aspect, the method further comprises modifying the comparison threshold.

Another aspect relates to a method for discriminating and identifying metallic objects utilizing one or more metal detectors disposed proximate a disposal repository to prevent false detection alarms. The method includes maintaining an electronic library of measured voltage versus time responses, each maintained voltage versus time response corresponding to an object for which it is desired that an alarm not be provided; maintaining a comparison threshold; and measuring, utilizing the one or more metal detectors, a voltage versus time response for an unknown object dropped into the disposal repository. The method further includes, for each respective maintained response in the electronic library, until either it is determined that a match is found or all maintained responses have been compared without a match having been found, comparing the sum of the squares of the differences between the measured response for the unknown object and the respective maintained response to the comparison threshold, and based on the comparison, either determining that a match has been found and an alarm should not be provided, or determining that a match has not been found, wherein the unknown object is determined to match one of the objects for which it is desired that an alarm not be provided based on the comparison of the sum of squared differences for a particular maintained response of the electronic library to the comparison threshold; wherein, based on the determination that the unknown object matches one of the objects for which it is desire that an alarm not be provided, an alarm is not provided.

Another aspect relates to a system which includes a disposal repository; and one or more metal detectors disposed proximate the disposal repository. The system further includes one or more computer readable media containing data corresponding to a maintained electronic library of measured voltage versus time responses, each maintained voltage versus time response corresponding to an object for which it is desired that an alarm not be provided, data corresponding to a maintained comparison threshold, and computer executable instructions for performing a method for discriminating and identifying metallic objects utilizing the one or more metal detectors disposed proximate the disposal repository to prevent false detection alarms. The method includes measuring, utilizing the one or more metal detectors, a voltage versus time response for an unknown object dropped into the disposal repository, for each respective maintained response in the electronic library, until either it is determined that a match is found or all maintained responses have been compared without a match having been found, comparing the sum of the squares of the differences between the measured response for the unknown object and the respective maintained response to the comparison threshold, and based on the comparison, either determining that a match has been found and an alarm should not be provided, or determining that a match has not been found, wherein the unknown object is determined to match one of the objects for which it is desired that an alarm not be provided based on the comparison of the sum of squared differences for a particular maintained response of the electronic library to the comparison threshold; wherein, based on the determination that the unknown object matches one of the objects for which it is desire that an alarm not be provided, an alarm is not provided.

Additional aspects of the present invention include incorporation and use of one or more of the above aspects and features of the present invention in the innovative waste receptacles disclosed in U.S. patent application Ser. Nos. 14/815,605 and 15/421,414—and any patent issuing therefrom and any patent application publication thereof—the disclosures of which are explicitly incorporated herein by reference, and for which there is overlap in one or more inventors between the present application and such incorporated patent references.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
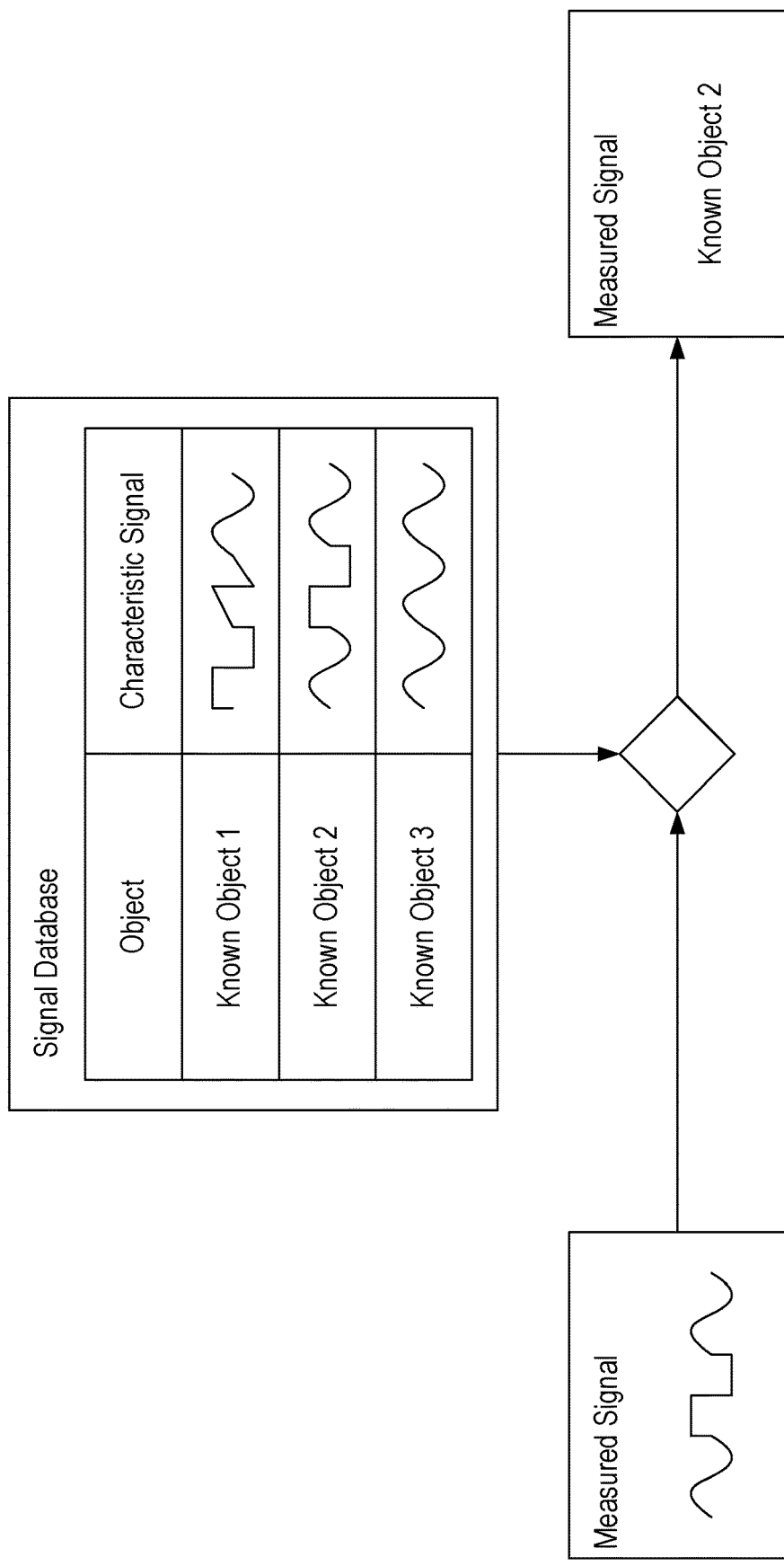
FIG. 1 illustrates referencing of received signals against signals of known objects.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the invention are next described. The following description of one or more preferred embodiments is merely exemplary in nature and is in no way intended to limit the invention, its implementations, or uses.

In accordance with one or more preferred implementations, a method involves discrimination between different metallic objects. In accordance with one or more preferred implementations, a method provides a metal detector the ability to signal a user if a reusable object has been thrown away while still allowing an inexpensive disposable object which may contain metal to be thrown away without signaling the user. Such a method reduces the instances of "false positives".

The motion of a conductor through a magnetic field results in minute currents being generated within the conductor. The magnetic field can be generated by a permanent magnet or by the application of the flow of electricity to a coil of conductors. As a conductor enters in to the magnetic field, the field will induce currents of electrons that will swirl within the conductor much like the small swirling currents in a flowing body of water. These currents remain as the external field exists. If the field is removed, the currents within the conductor will decay over a period of time. With conductors possessing high conductivity, these currents will decay slower than those in a lower conductivity conductor. With the external field removed, and before the currents have disappeared, the eddy currents will themselves develop a magnetic field. In the opposite manner of energizing a coil to produce a magnetic field, if a coil of conductors is placed within a magnetic field, a voltage will be generated along the length of the coil. This theory is used to detect the presence of metal near a conductor coil.

There are two primary methods for utilizing these components to detect metal: continuous wave (CW) or pulse induction (PI). In a CW system, a continuous signal is generated by a coil transmitter which develops a magnetic field around the coil. A receive coil is able to pick up the sign from the transmitter and the two signals are compared. If an object that can carry a magnetic field enters into proximity to the transmitter, the signal between the transmitter and the receive coil is disrupted. This disruption is the basis for CW detection systems.

A system operating on a PI will pulse an environment generating a cyclic magnetic field. When the transmit coil is turned off, any conductor that was within the transmit coils magnetic field will generate a magnetic field as it decays. A receiver coil is able to then detect the decaying magnetic field from the object and in the control system is able to distinguish that an object was present.

Objects of different metallic composition and geometry will elicit different responses from a metal detector. The field generated by the internal eddy currents in one type of metal may decay faster than the field generated in another type of metal. In addition, the field in a long skinny object may behave differently than that of an object which is generally spherical.

In accordance with one or more preferred implementations, a method involves measuring the signal response from a metal detector at different points in time, and a system references the received signal against those of known objects and matches the received signal to a particular metal composition or shape, as illustrated in FIG. 1. In this manner, the system can discriminate between an object that should be in the waste for disposal and one that is costly and should be reused.

Discrete Time Interval Signal Monitoring

In accordance with one or more preferred implementations, the signal response recorded by a metal detector is a continuous analog voltage signal. The signal is passed through an analog to digital converter (ADC) which converts the measured voltage into values which the electronics module is able to interpret. Each sample is taken at a time interval. More samples can be taken to increase the resolution with the detriment to processing time. Fewer samples results in a lower resolution but can significantly increase the speed at which the conversion takes place.

When the comparison between the measured signal and the characteristic signals is made with the discrete sample method, each time sample is compared with the same time sample in the characteristic signals. This difference can be summed and the characteristic signal with the least amount of deviation from the measured signal can be identified.

Continuation Wave Signal Monitoring

In contrast to the discrete time interval measurement, the measured signal can be analyzed as a continuous function against time. This continuous method brings to benefit the high accuracy signal processing methods which can be applied to continuous signals. There are two primary methods for analyzing the continuous signals: time domain and frequency domain.

For either method, the measured signal is reduced down into a series of variables. The software uses these variables to reference the variables of known objects. If the software can find a set of variables which best match the measured variables, the object can be identified.

Time Domain

When the analysis evaluates the signal in the time domain, the program is looking to modify variables to fit a curve to the measured signal. As the values for the fit curve are modified, the difference between the fitted curve and the measured signal is monitored. The aim for the program is to minimize the difference between the fitted curve and the measured signal. When the program has determined that the fitted curve is as close to the measured signal as it can achieve within a given time frame or error limit, the input values which were used to fit the curve to the signal are recorded. These values are then compared to the values of known curves. The known object whose values best match the values used for the fitted curve is then assumed to be the object that the detector has measured.

Frequency Domain

Any continuous wave or signal can be made up from the sum of separate frequencies. When a continuous signal is converted into the frequency domain, the specific frequencies and their respective amplitudes which model the sampled signal are solved for. These amplitudes and frequencies are different for each signal.

Each object which is expected to the used in the operating room is measured with the metal detector. A database is constructed which contains the measured amplitudes and individual frequencies which are characteristic of each of the objects. When the measurement and conversion to the frequency domain is performed on the measured signal, the amplitudes and frequencies which make up the measured signal are compared to those in the database and the match is found.

Suppressing an Alarm for Known Metallic Targets

In accordance with one or more preferred implementations, a methodology involves suppressing or turning off an alarm or signal of a metal detector for a set of known, metallic targets.

For example, some bandages come in metallic foil-backed wrappers and it is highly desirable for a medical waste receptacle, with metal detection and alarm functions, not to alarm when the user discards one of these wrappers.

The quasi-magnetostatic response function of metallic targets is exponential in form or can at least be accurately described as a sum of weighted exponentials. Different metallic targets have different exponential decay rates and discrimination can be carried out using a scheme to sort among targets based upon their exponential decay rates. However, this type of discrimination problem can present significant challenges. If the response function is oscillatory, then the problem becomes much simpler. The Fourier Transform of an oscillatory response yields line spectra so targets can be separated (discriminated) based simply on the position of their energy in the frequency domain. The transform of an exponential function (or weighted sum of exponential functions), on the other hand, is distributed over frequency (no peaks) making it much harder to distinguish among different decay rates and therefore different objects.

Figures 2, 3:
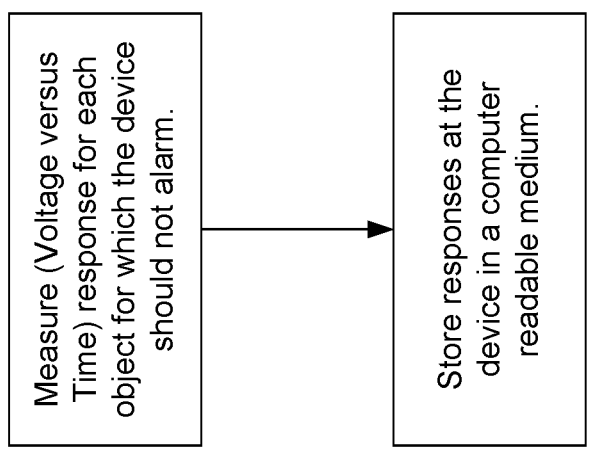
FIG. 2 illustrates an exemplary methodology for creating a target library for use in accordance with one or more preferred implementations.
FIG. 3 illustrates equations for use in accordance with one or more preferred implementations.

In accordance with one or more preferred implementations, a method for providing a metal detecting medical waste receptacle with discrimination capability involves determining a collection of the metallic objects (targets) that it is desired for the medical waste receptacle to not alarm on. If these targets have a significantly different quasi-magnetostatic response from the targets that it is desired for the medical waste receptacle to issue an alarm for, then it is possible to winnow out the undesirable targets based on their unique features. For example, one target may be larger than the rest and therefore its response contains significantly more energy. So in this case, it is only necessary to set an energy threshold that, if exceeded, would guarantee no response. In accordance with one or more preferred implementations, a method for discrimination involves complete knowledge of the response characteristics of the targets that it is desired that the waste receptacle not alarm on. Discrimination algorithms perform poorly if they are "data starved". FIG. 2 illustrates an exemplary methodology for creating a target library for use in accordance with one or more preferred implementations.

In accordance with one or more preferred implementations, if data is contaminated with white Gaussian noise then a least squares approach to discrimination is best.

In accordance with one or more preferred implementations, when an object is dropped into a medical waste receptacle, a detector first measures its voltage versus time response. In accordance with one or more preferred implementations, a metal detecting medical waste receptacle utilizes a digital signal processor, and the voltage response is sampled at a number of discrete times over some predetermined period of time. When it is not known in advance if the object being placed into the waste receptacle should be ignored, it must be "compared" to the response of each and every target that is to be ignored. A method of discrimination is accomplished by comparing the sum of the squares of the differences between the measured response and the response of each target to be ignored to a preselected threshold (typically some small number). If the sum of squared differences is small then the measured data matches one of the objects to be ignored, otherwise it does not. If there is no match then the metal detection system employed in the medical waste receptacle must proceed to compare the sum of squared differences for the next target in the library and this process continues until all targets in the library have been examined.

In accordance with one or more preferred implementations, the voltage versus time response of a target may be represented by equation (1) illustrated in FIG. 2.

Equation (1) describes the voltage measured (or acquired) by a waste receptacle's microcontroller. Let $\overline{v}_M$ represent N equally spaced samples in time. All samples are separated in time by duration $\Delta t$. The M subscript denotes "measured".

Now let equation (2) illustrated in FIG. 2 represent the measured voltage for the Jth target stored in the waste receptacle's memory. Note that according to the notation in (2) there are K targets in the library for which we desire the waste receptacle not to alarm.

Discrimination proceeds by first forming equation (3) illustrated in FIG. 3. Note that (3) is the sum of the squares of the differences between the measured voltage $\overline{V}_M$ and the stored voltage $\overline{V}_J$. The summation has N terms corresponding to the N equally spaced samples in time. Note that equation (3) constitutes K numbers one for each target in the library. Again, the library contains voltage signatures for those K targets that we don't want the waste receptacle to alarm on.

As mentioned earlier, discrimination is carried out by comparing all $D_{M,J}$ to a threshold. If the threshold is exceeded for all K targets in the library then the waste receptacle should alarm on the measured data. This corresponds to the case that the measured target is nowhere to be found in the library of stored targets. If $D_{M,J}$ is below the threshold for any one of the K targets then a "match" has been found and the waste receptacle should not alarm on the measured target. Note, in the worst case, K comparisons would need to be made before a final decision could be rendered.

Figure 4:
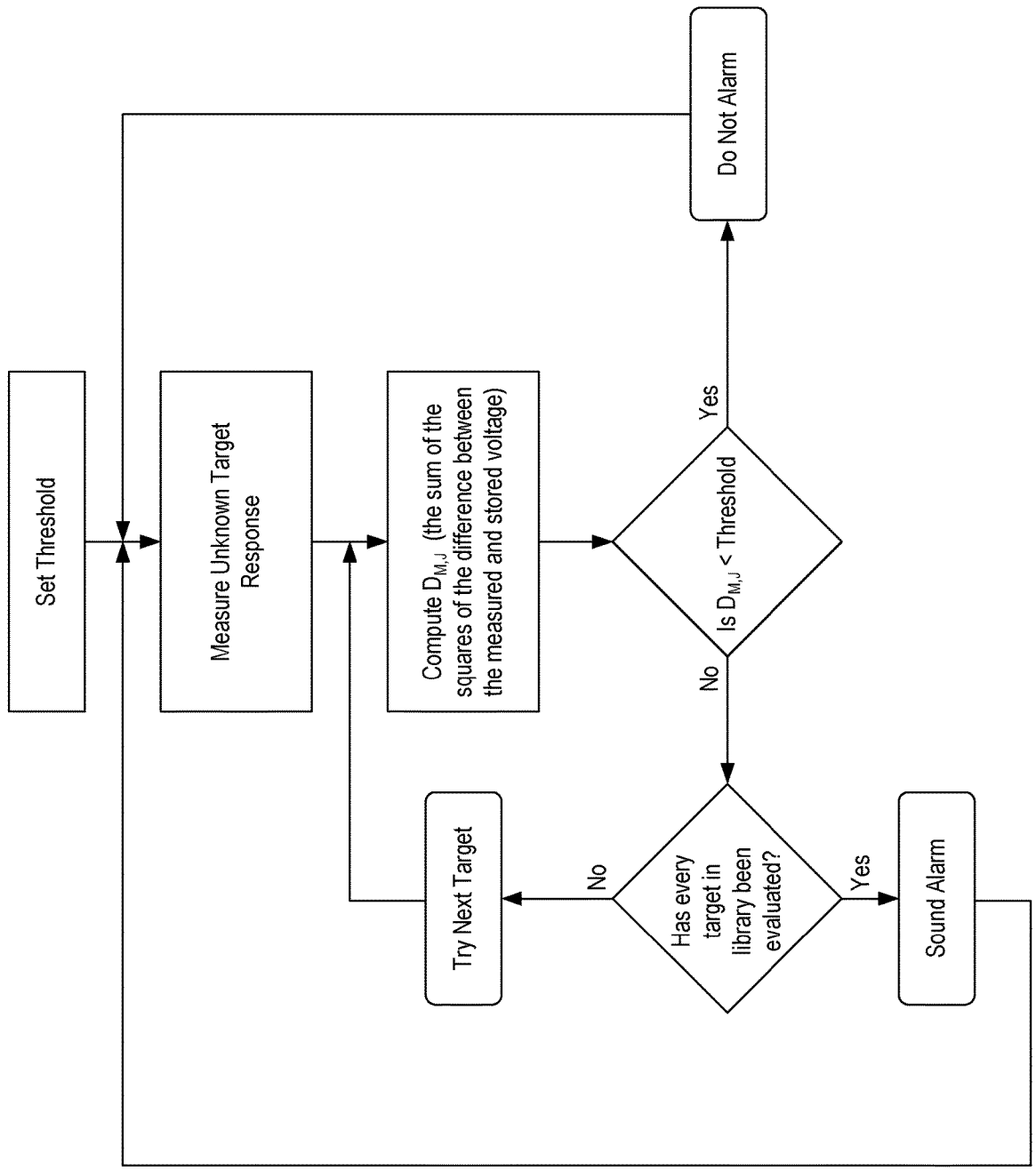
FIG. 4 illustrates a flow for an exemplary methodology for providing discrimination capability to a medical waste receptacle comprising a medical detector.

FIG. 4 illustrates a flow for an exemplary methodology for providing discrimination capability to a medical waste receptacle comprising a medical detector.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for differentiating a metallic object utilizing one or more metal detectors disposed proximate a disposal repository, the method comprising:
   (a) measuring, utilizing the one or more metal detectors, voltage versus time responses for an unknown metallic object dropped into the disposal repository;
   (b) determining whether a sum is less than a comparison threshold, the sum being of the squares of the differences between a response corresponding to a known metallic object and the measured voltage versus time responses measured in said step (a) for the unknown metallic object; and
   (c) sounding an alarm when the sum is not less than the comparison threshold.

2. The method of claim 1, wherein the disposal repository comprises a waste disposal repository.

3. The method of claim 1, wherein the response corresponding to the known metallic object is maintained in an electronic library of responses corresponding to disposable metallic objects commonly used in a medical facility.

4. The method of claim 3, wherein the maintained electronic library of responses comprises a response corresponding to a sheet with an annealed metal wire.

5. The method of claim 3, wherein the maintained electronic library of responses comprises a response corresponding to a foil-backed wrapper.

6. The method of claim 3, wherein the disposal repository comprises a waste disposal repository that is located at a medical facility.

7. A method for differentiating a metallic object utilizing one or more metal detectors disposed proximate a disposal repository, the method comprising:
   (a) maintaining voltage versus time responses in an electronic library of voltage versus time responses, each corresponding to a disposable metallic object;
   (b) maintaining a comparison threshold;
   (c) measuring, utilizing the one or more metal detectors, voltage versus time responses for an unknown metallic object dropped into the disposal repository;
   (d) for each voltage versus time response that is maintained in the electronic library, determining whether a sum with respect to said voltage versus time response is less than the comparison threshold, the sum being of the squares of the differences between said voltage versus time response and the voltage versus time responses measured in said step (c) utilizing the one or more metal detectors; and
   (e) sounding an alarm when the sum is not less than the comparison threshold for each said voltage versus time response that is maintained in the electronic library.

8. The method of claim 7, wherein the disposal repository comprises a waste disposal repository.

9. The method of claim 7, wherein the electronic library of responses comprises responses corresponding to disposable metallic objects that are commonly used in a medical facility.

10. The method of claim 9, wherein the electronic library of responses comprises a response corresponding to a sheet with an annealed metal wire.

11. The method of claim 9, wherein the electronic library of responses comprises a response corresponding to a foil-backed wrapper.

12. The method of claim 9, wherein the disposal repository comprises a waste disposal repository that is located at a medical facility.

13. A system comprising
   (a) a disposal repository;
   (b) one or more metal detectors disposed proximate the disposal repository;
   (c) one or more computer readable media containing
      (i) data corresponding to a maintained electronic library of voltage versus time responses, each maintained voltage versus time response corresponding to a disposable metallic object,
      (ii) data corresponding to a maintained comparison threshold,
      (iii) computer executable instructions for performing a method for differentiating a metallic object utilizing the one or more metal detectors disposed proximate the disposal repository, the method comprising
         (A) measuring, utilizing the one or more metal detectors, voltage versus time responses for an unknown metallic object dropped into the disposal repository,
         (B) for each voltage versus time response that is maintained in the electronic library, determining whether a sum with respect to a maintained voltage versus time response in the electronic library is less than the comparison threshold, the sum being of the squares of the differences between the maintained voltage versus time response and the voltage versus time responses measured utilizing the one or more metal detectors, and
         (C) sounding an alarm when the sum is not less than the comparison threshold for each said voltage versus time response that is maintained in the electronic library.

14. The system of claim 13, wherein the disposal repository comprises a waste disposal repository.

15. The system of claim 13, wherein the electronic library of responses comprises responses corresponding to disposable metallic objects that are commonly used in a medical facility.

16. The system of claim 5, wherein the electronic library of responses comprises a response corresponding to a sheet with an annealed metal wire.

17. The system of claim 15, wherein the electronic library of responses comprises a response corresponding to a foil-backed wrapper.

18. The system of claim 15, wherein the disposal repository comprises a waste disposal repository that is located at a medical facility.

* * * * *